Nov. 4, 1969    A. K. CHITAYAT    3,476,476

ALIGNMENT MEANS FOR PHOTO REPEAT MACHINE

Filed March 28, 1967    2 Sheets-Sheet 1

*INVENTOR.*
ANWAR K. CHITAYAT
J.P. Malone

INVENTOR.
ANWAR K. CHITAYAT

United States Patent Office 3,476,476
Patented Nov. 4, 1969

3,476,476
ALIGNMENT MEANS FOR PHOTO REPEAT MACHINE
Anwar K. Chitayat, Plainview, N.Y., assignor to OPTOmechanisms, Inc., Plainview, N.Y.
Filed Mar. 28, 1967, Ser. No. 626,532
Int. Cl. G03b 27/00, 27/32, 27/42
U.S. Cl. 355—1
1 Claim

ABSTRACT OF THE DISCLOSURE

Alignment means for a projector of the type projecting art work from a glass plate onto a photo sensitive plate. The glass plate is adjustably mounted. Index marks on the photo plate are projected in superimposed relation with corresponding index marks on the glass plate. The glass plate is manually aligned by superimposing the two sets of index marks.

---

Step and repeat projectors are used in making precision microcircuits. It projects a demagnified image from negative onto a photo sensitive plate which is mounted on a precision stepping platform. At each step the platform stops and the projector lamp is flashed making repeated images on the photo sensitive plate.

The negative is mounted on a glass plate and it is necessary to align the glass plate and the photo sensitive plate with great precision.

One of the present techniques of the step and repeat process is to reduce the artwork onto a photo plate, which is then positioned onto a master reticle alignment instrument. This instrument then precisely locates the glass plate onto a metallic plate, which is then placed on top of the step and repeat machine.

The present invention utilizes a method where the photo glass plate can be placed directly on the photo repeat machine without the requirement of separate cementing onto its own plate. The approach utilizes techniques where the X and Y coordinates of the step and repeat machine are used for X-Y alignment. Only one adjustment (that of rotation) is required by the operator. It is believed that this alignment will add only a few seconds to the stop and repeat process, every time a new plate is placed. This additional time is only a small percentage of the total step and repeat process (1 to 3% added time). However, the advantages are quite important:

(1) Eliminates a whole operation of alignment and cementing of a glass plate to a metal frame.
(2) The accuracy is enhanced beyond present capabilities. The present system introduces additional inaccuracies which are completely eliminated by the new approach.
(3) It provides a method where a check is made on the final magnification at the photo mask, precise adjustment can be made. This eliminates a major source of error in the step and repeat process. It also provides a method where focus is automatically checked and adjusted.

In the present invention the step and repeat machine is provided with a lower plate holder which contains two illuminated cross hairs. These cross hairs are placed at the starting position.

The illuminated reticles are placed in a position which corresponds to the alignment cross hairs in the upper plate. The upper glass plate normally contains two corresponding alignment cross hairs which are 0.8" apart. At 4:1 reduction this should correspond with two illuminated reticles 0.8"/4=0.2" apart at the lower plate holder.

In order to set-up the instrument, the operator merely observes the actual cross hair on the upper plate being superimposed on the alignment cross hairs. The observation is performed by two microscopes looking at the upper plate as shown in FIGURES 1 and 2. The observation mirror above the upper plate is displaced when normal flashing is performed.

The observation can be performed in one of three ways:
(1) Two microscopes with prisms to relay the images at a comfortable viewing level.
(2) Two small rear projection screens.
(3) Remote TV camera looking at the two images. This TV camera can be inexpensive since the field of view is very small.

In any case, the alignment should not require a trained observer, since the operator merely superimposes the cross hairs.

Accordingly a principal object of the invention is to provide new and improved alignment means for a step and repeat machine.

Another object of the invention is to provide new and improved alignment means whereby the glass plate negative may be adujstably mounted onto the photo repeat machine.

Another object of the invention is to provide new and improved alignment means for a photo repeat machine comprising means to project index marks from the stepping platform through corresponding index marks on the glass plate negative and means to observe the alignment of said index marks.

Another object of the invention is to provide new and improved alignment means for step and repeat machines wherein the glass plate negative has a pair of index marks and the glass plate is mounted so as to rotate about one of said index marks.

Another object of the invention is to provide new and improved precision step and repeat machine for projecting an image on a glass plate repeatedly onto a photo sensitive plate on a stepping platform; means to accurately align said glass plate in a predetermined starting position comprising, means to movably mount said glass plate, first index marks on said glass plate, a reticle fixedly mounted on said stepping platform said reticle having second index marks corresponding to said first index marks, means to illuminate said reticle and project said reticle image through said glass plate and means to observe said first index marks and said projected reticle, and means to adjust said glass plate to line up said index marks to said projected reticle image.

These and other objects of the invention will be apparent from the following specification and drawings of which:

Figure 1:
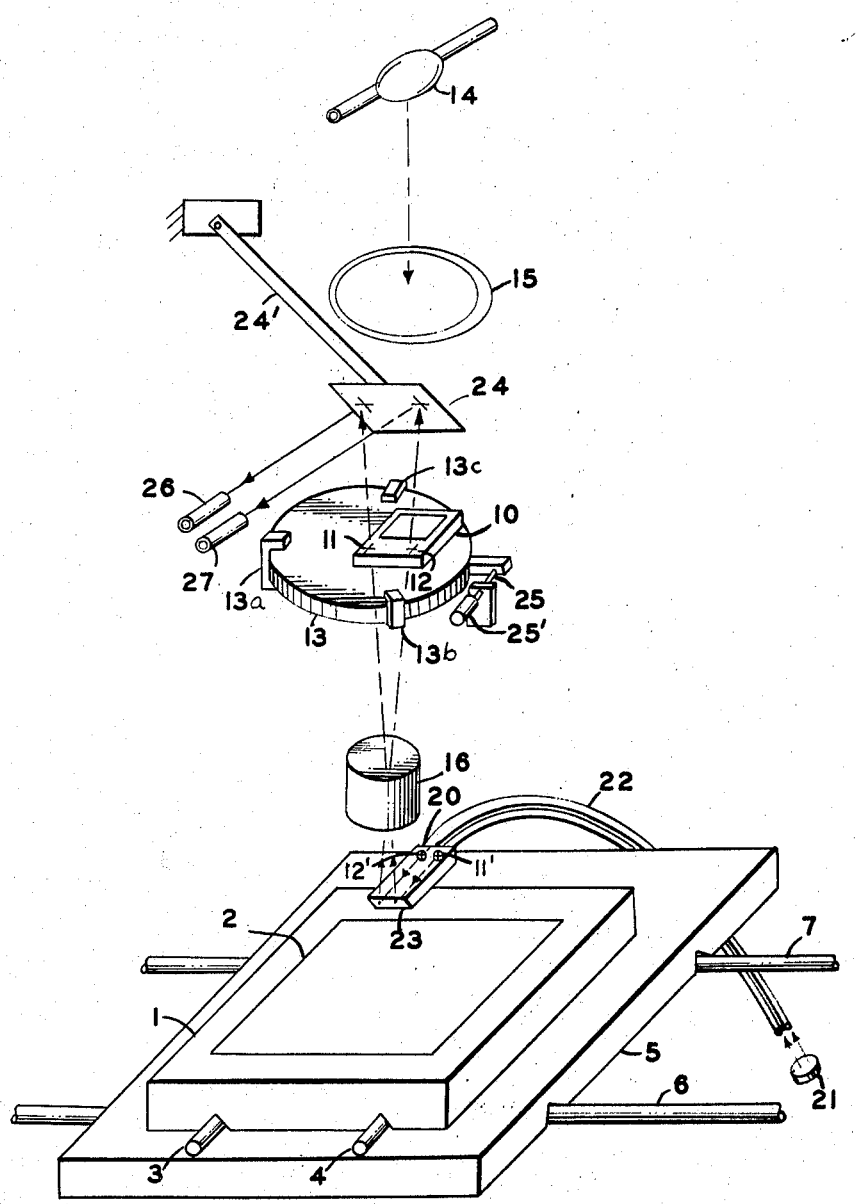
FIGURE 1 is a schematic diagram of an embodiment of the invention.

Referring to FIGURE 1, a step and repeat machine generally comprises a lower plate holder 1 which mounts a photo sensitive plate 2. The plate holder 1 is mounted for movement along X and Y coordinate axes. More specifically, the lower plate holder 1 is adjusted to move along the Y axis, on precision rails 3 and 4 which are mounted on the X carriage 5 which is adapted to move along the X axis on precision rails 6 and 7. A suitable precision drive mechanisms with servo control to provide the X and Y movements is preferably incorporated. However this is outside the scope of the present invention.

The art work to be projected is mounted on precision plate 10 which has a pair of index marks 11 and 12. The glass plate is mounted on supporting structure 13. Mounted above the glass plate is a flasher lamp 14 together with a suitable optical system 15 for projecting the image on the glass plate through the objective lens 16 and onto the photo sensitive plate 2.

Everything that is described thus far is conventional, except support 13 is not adjustable in conventional machine so that the glass plate must first be precision mounted on a metal plate, not shown, which is made part of the supporting structure.

In the present invention, the metal mounting plate is eliminated and the glass plate is mounted on the adjustable support 13. The support 13 is rotatably adjustable about the index mark 11 in fixed mountings 13a, 13b, 13c.

A reticle 20 having a corresponding pair of index marks 11' and 12' fixedly mounted on the lower platform 1 in a predetermined position such that when the index marks on the lower plate are projected upwardly and the glass plate adjusted to align the marks then the system will be aligned at the proper starting point.

The index marks on the reticle 20 are illuminated by means of a light source 21 and a flexible fiber optic cable 22. The images of index marks are reflected off the prism 23 and upwardly through the objective lens 16 and through the glass plate 10 onto the reflector 24. A pair of eye pieces 26, 27 are mounted to observe the marks reflected by the reflector 24. The glass plate 10 is mounted on the supporting structure 13 which is rotatably mounted so that the glass plate is adapted to be rotatably adjustable about the index mark 11.

In order to align the machine, the operator first lines up the center of index mark 11 with the corresponding projected index mark from the lower plate by means of mnually moving the carriages 1 and 5.

The alignment mark 12 is then aligned with the projected image with the corresponding mark by rotating the glass plate by means of the rotation adjustment screw 25 and knob 25'. Mirror 24 is mounted on a lever 24' which is pivotally mounted. After the machine is aligned, the reflector 24 is removed and the machine is ready to operate in conventional manner.

Figure 2:
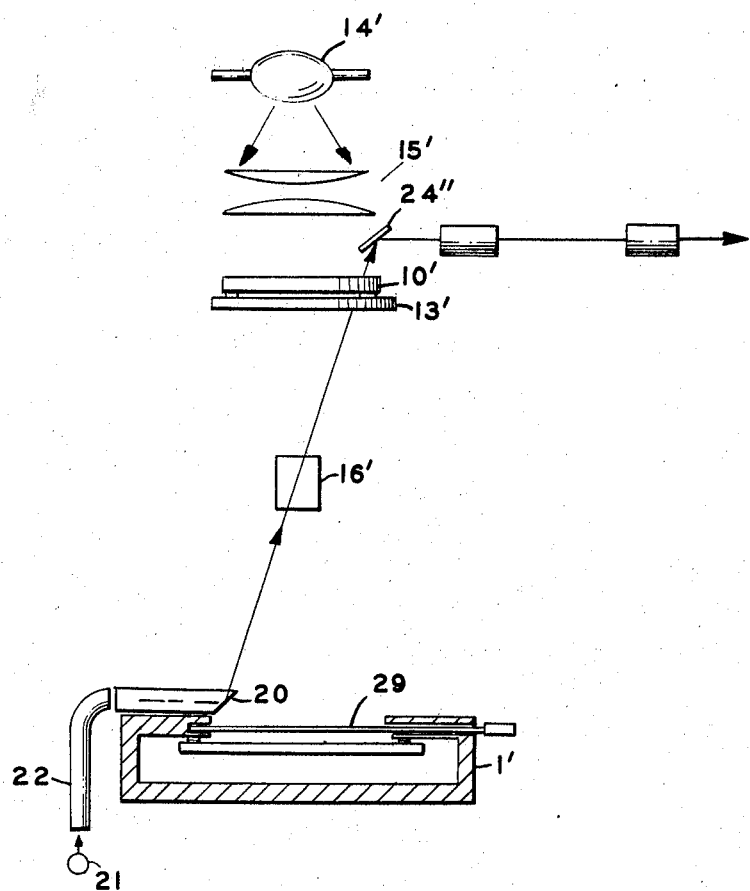
FIGURE 2 is a schematic diagram of a modification of the invention.

FIGURE 2 illustrates a modification of the invention wherein the reflector 24" is not removable but is fixedly mounted on one side of the machine. In this embodiment the lower plate holder 1' also has a removable light shield 29 to protect the photo sensitive plate 2 during the alignment procedure.

The remaining elements of FIGURE 2 are similar to those of FIGURE 1 and comprise a light source 14', the condenser optics 15', glass plate 10', and the adjustable mounting 13', and the objective lens 16'. The lower plate holder has the same recticle 20, light source 21, and fiber optic cable 22. The fiber optic cable is removable from the lower plate holder after the alignment procedure has been completed.

The operation is as follows:

(A) The upper plate is placed in position and clamped.

(B) The operator moves the X and Y contact hand wheels of the X and Y carriages until the right cross hair is aligned to the right illuminated reticle. The operator then rotates the upper plate holder by adjustment knob 25' until the left index mark is in alignment with the left illuminated reticle. Note that the design of the rotating mechanism is such that the rotation is about the right cross hair, so that X–Y readjustment is usually unnecessary.

(C) After the above procedure, the operator pulls the mirror 24 from above the plate.

ADDITIONAL COMMENTS (A) The above system is self checking, since the operator can check the illuminated data position by using the upper plate, and align the right cross hair to the right illuminated reticle. He then moves the X and Y carriages until now the left illuminated reticle is under the same right cross hair. This measurement must then correspond to the desired distance between reticles.

(B) Two illuminated cross hairs are not necessary in the above system, since the operator can move the X carriage until the same illuminated cross hair is under the both left and right reticles. However, the above provision is desirable to save time in alignment.

(C) The main purpose behind the approach is to eliminate the errors of alignment due to the reticle alignment fixture which is in present use. Its purpose is also to provide a precise adjustment of magnification or demagnification.

PRECISION ANALYSIS OF VARIOUS PARAMETERS OF STEP AND REPEAT PROCESS

The following section describes the requirements of the various operations in a step and repeat process in order to realize ten (10) microinch repeatability of positioning. The use of present techniques are assumed: That is; artwork is reduced to photo plate which contains alignment cross hairs, then to master reticle alignment instrument where glass plate is fixed to holder; after which, the frame is placed on the photo repeater.

(1) The master Rubylith or large plate is normally 100 to 200 times the final photomask dimensions. Consequently, in order to achieve 10 microinch fidelity on the photomask, we can allow only .001" to .002" tolerance on the original. Obviously, better than .001" or the master must be realized, if 10 microinch final result must be achieved. The positioning of the alignment mark must also maintain this accuracy of better than .001" over the full format also of 20" or more. The percentage accuracy here is quite stringent; .001"/20=50 parts per million (.005%) or better. This same accuracy is required of the reduction camera and step and repeat lens (distortion less than .005%).

(2) The glass plate of 1.2" x 1.2" dimension at 4× has very critical dimensional tolerances for the image. Thus, 10 microinches on the photomask represents only 40 microinches on the glass plate. Positioning must be accurate to better than 10 microinches in both X and Y directions. If the format has 0.4" diagonal, then the angular positioning required is 40 microinches in 0.4" or =10 seconds of arc.

(3) The positioning of the plate on the frame must be realized to very high degrees of repeatability relative to the pins. In order to achieve 10 microinches on the high resolution plate, the following parameters must be realized (at 4× lens):

(a) X and Y positioning must be repeatable to 40 microinches.

(b) Angle must be accurate and repeatable to 40 microinches in each half diagonal of 0.8", which results in accuracy requirement of 10 seconds of arc.

(c) Another important parameter is the "Z" dimension or distortion of the plate. At the corner of the plate, its distance from the optical axis can be as large as 0.8" to the conjugate to the lens of approximately 10". Consequently, for 40 microinches movement, the maximum feasible "Z" dimension is $$40 \times 10/0.8$$

equals .0005". This is a very small number considering that it is an accumulation of the flatness of the metallic plate, flatness of glass plate, method of positioning of the two surfaces and possibility of dust particles between them.

(d) Wedge angle: If the plate is not parallel to the mounting plane, then errors will result to move the image at the edges in the X or Y direction. Based on the above, the maximum allowable angle is .0005" in 0.8"= two minutes of arc.

(4) Once the plates are mounted, they must not shift relative to the metallic surfaces due to the curing of cement, temperature or other parameters.

(5) The step and repeat machine must be perfectly stable. The pins that locate the upper plate must be stable relative to the base of the machine.

The following accuracies must be maintained:

(a) The lower photomask holder must not shift during the step and repeat process by no more than 10 microinches relative to the upper plate. The upper plate. holder can shift by 40 microinches (at 4×). However, the lens holder cannot shift by more than 10 microinches. This means that all parts must expand together. Thus, if one assumes that at the beginning of step and repeat, the granite and casting holding the lens are both 68°, then at the end of the step and repeat process, the temperature of the casting has shifted by 0.2° F. while the granite has remained fixed in temperature. Now this 0.2° F. acts on the full lever arm of 8″. Note this displaces the image by 8″ × 6 p.p.m. × 0.2° F.=10 microinches.

The above parameter of temperature is not a major factor, as long as the total time is relatively short between first and last exposure. However, if the time exceeds ½ to 1 hour, serious errors can ensue.

(b) As one upper photo plate is removed, and the second is placed in its place, there cannot be a shift in any of the following:

(I) The pins, holder and/or associated mounts cannot shift by more than 40 microinches.

(II) The upper plane cannot shift by more than 0.0005″ in the "Z" dimension. Note that this change of .0005″ moves the image of each end of the diagonal by 10 microinches, resulting in a total change of image size by 20 microinches.

(III) The lens position and lower plate position must not move in the X, Y direction by 10 microinches during the step and repeat process. In addition, the "Z" dimension must not move by .0001″. At this displacement, the error results in changing the distance between the end of the diagonal by 10 microinches on each side with a total of 20 microinches change in 0.4″ diagonal.

Many modifications may be made by those who desire to practice the invention without departing from the scope thereby which is defined by the following claim:

1. In a device for projecting an image from a glass plate master onto a photo sensitive plate,
means to accurately align said glass plate in a predetermined position relative to said photo sensitive plate comprising,
means to movably mount said glass plate,
first index marks on said glass plate,
a reticle fixedly mounted on said photo sensitive plate said reticle having second index marks corresponding to said first index marks,
means to illuminate said reticle and project said reticle index marks and said glass plate index marks in superimposed relation,
means to observe said superimposed first index marks and said reticle index marks,
means to adjust said glass plate to line up said index marks to said projected reticle image,
said index marks on said glass plate and reticle comprising a pair of spaced marks and means to mount said glass plate to rotate about one of said marks.

References Cited
UNITED STATES PATENTS 3,163,080 12/1964 Miller _____ 355—1
3,192,844 7/1965 Szasz et al. _____ 33—184.5 XR NORTON ANSHER, Primary Examiner R. L. MOSES Assistant Examiner U.S. Cl. X.R.
355—53, 77